US008340378B2

(12) United States Patent
Knapp et al.

(10) Patent No.: US 8,340,378 B2
(45) Date of Patent: Dec. 25, 2012

(54) RIBCAGE SEGMENTATION

(75) Inventors: Jason Knapp, Miamisburg, OH (US);
Richard V. Burns, Beavercreek, OH (US); Praveen Kakumanu, Mason, OH (US)

(73) Assignee: Riverain Medical Group, LLC, Miamisburg, OH (US)

( * ) Notice: Subject to any disclaimer, the term of this patent is extended or adjusted under 35 U.S.C. 154(b) by 1011 days.

(21) Appl. No.: 12/252,615

(22) Filed: Oct. 16, 2008

(65) Prior Publication Data
US 2010/0098313 A1  Apr. 22, 2010

(51) Int. Cl.
*G06K 9/00* (2006.01)
*G06K 9/34* (2006.01)
*G06K 9/62* (2006.01)
*G06K 9/42* (2006.01)
*G06K 9/44* (2006.01)

(52) U.S. Cl. ........ 382/128; 382/164; 382/173; 382/224; 382/256

(58) Field of Classification Search ................ 382/128, 382/132, 164, 173, 224, 256
See application file for complete search history.

(56) References Cited

U.S. PATENT DOCUMENTS

| 7,004,904 | B2 * | 2/2006 | Chalana et al. | 600/443 |
| 2005/0033139 | A1 * | 2/2005 | Li et al. | 600/407 |
| 2007/0047790 | A1 * | 3/2007 | Dewaele | 382/128 |
| 2008/0152220 | A1 * | 6/2008 | Shi et al. | 382/164 |

OTHER PUBLICATIONS

Yue, Z.—"Automatic detection of rib borders in chest radiographs"—IEEE 1995, pp. 525-536.*
Vinhais, C.—"Ribcage boundary delineation in chest x-ray images"—ICIAR 2004, pp. 59-67.*
Xu, X.—"Image feature analysis for computer-aided diagnosis: Accurate determination of ribcage boundary in chest radiographs"—Med. Phys. 22 (5), May 1995, pp. 617-626.*
"Automatic segmentation of lung fields in chest radiographs"; Bram van Ginneken et al., Image Sciences Institute, Utrecht University, The Netherlands, E-mail: bram@isi.uu.nl, URL: http://www.isi.uu.nl/, Publ. Year:2000.

* cited by examiner

*Primary Examiner* — Bernard Krasnic
(74) *Attorney, Agent, or Firm* — Connolly Bove Lodge & Hutz LLP

(57) ABSTRACT

A technique for segmenting a ribcage, e.g., in a chest radiograph, may involve determining whether or not the top of the image cuts through the lungs. The process may then proceed to segment the top and the sides of the ribcage. A dynamic programming technique may be used to perform the segmentation.

22 Claims, 11 Drawing Sheets

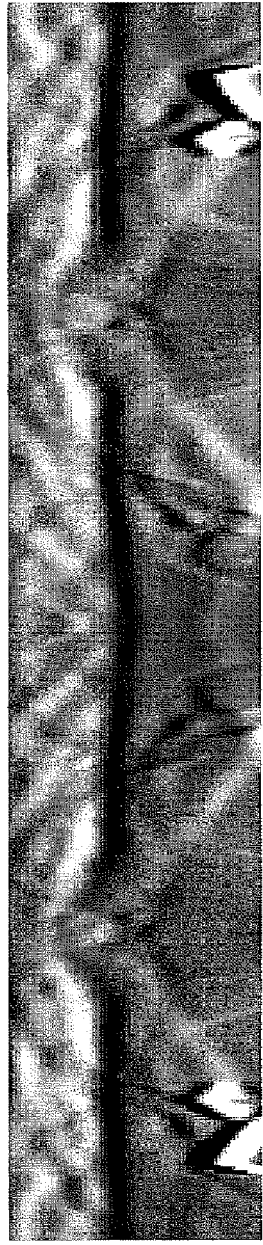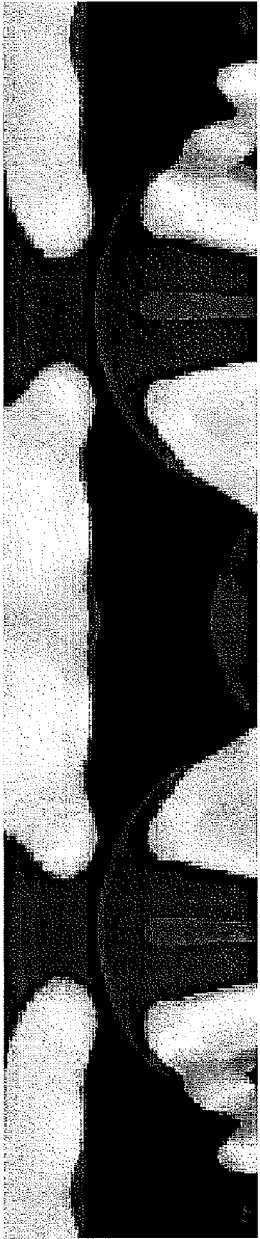
Fig. 6A — Second Derivative
Fig. 6B — Gradient Convergence
Fig. 6C — Shape Index

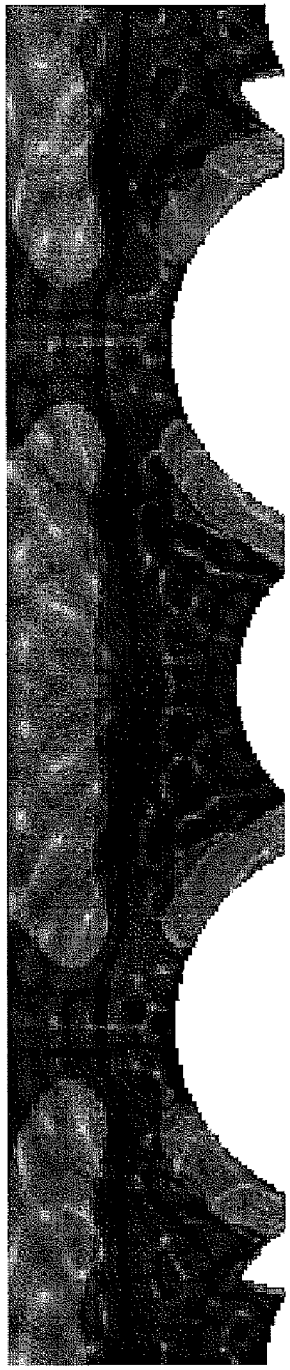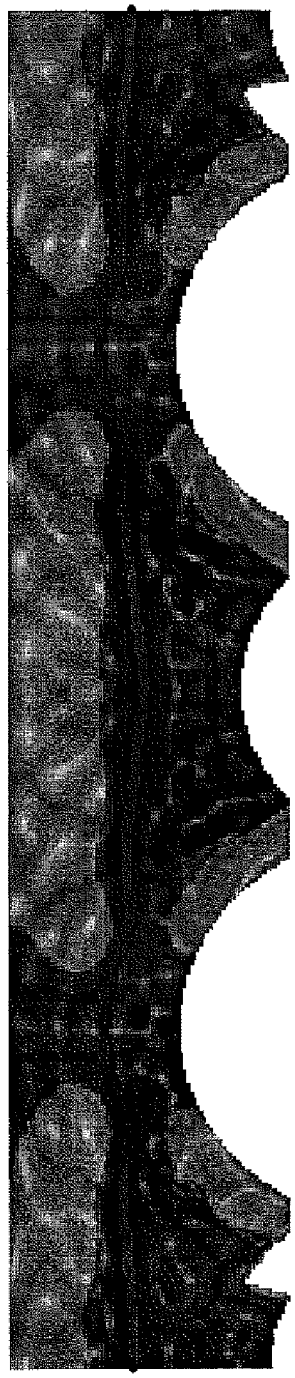

RIBCAGE SEGMENTATION

BACKGROUND

Robust segmentation of the ribcage may be important for automated analysis of chest radiographs. There are many difficulties that any method must contend with if consistent and reliable results are to be achieved. Most prior work has mainly relied on edge detection or direct segmentation of the air-filled lungs. These methods have little or no chance of working robustly on general radiographs, especially those acquired using portable x-ray devices.

One algorithm that attempts to address the general problem of image segmentation was detailed in the 2000 publication by van Ginneken, "Automatic Segmentation of Lung Fields in Chest Radiographs." In this paper, a series of rules are combined with pixel classification in order to segment the lung fields. The top section of the rib cage may be detected by using dynamic programming in the polar domain and second derivative information may be used in doing so. However, the techniques used in this paper tend to be sensitive to artifacts, due to the sole use of second derivative information. They also tend to be sensitive with respect to, for example, variations in contrast. Therefore, there remains room for improvement with respect to such algorithms.

SUMMARY OF THE INVENTION

Various embodiments of the invention may address segmentation techniques for radiographic images. Some embodiments may be directed to chest radiographs and/or to the segmentation of the rib cage in such radiographs. Various embodiments may take the form(s) of, for example, apparatus, method, hardware, software, and/or firmware.

BRIEF DESCRIPTION OF THE DRAWINGS

Various embodiments of the invention will now be described in conjunction with the accompanying drawings, in which:

FIGS. 6A-6C show local cost images that may be computed in various embodiments of the invention;

FIGS. 7A and 7B show a composite local cost image and the same image with a path traced through it, according to various embodiments of the invention;

DETAILED DESCRIPTION OF EXEMPLARY EMBODIMENTS OF THE INVENTION

Figure 1:
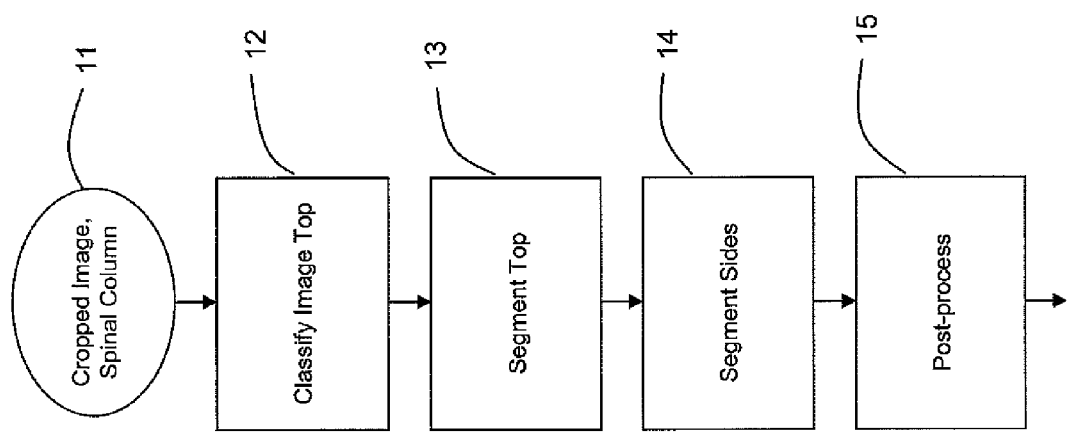
FIG. 1 shows a block diagram/flow diagram of an exemplary embodiment of the invention.

FIG. 1 shows an exemplary block/flow diagram according to various embodiments of the invention. As shown in FIG. 1, an approach according to various embodiments of the invention may be to identify the top of the image 12, 13 and to use information about the top of the image to guide segmentation of the lateral portions 14, 15.

The process may begin, in some embodiments, with pre-processing 11. Such pre-processing 11 may be helpful in reducing the amount of computation necessary to perform subsequent processes according to some embodiments of the invention. Such pre-processing 11 may include, for example, resizing to obtain coarser image resolution and/or cropping/editing of an input image, to eliminate extraneous content. For example, a 2 mm resolution may be used in some embodiments of the invention, to reduce the computational complexity of the process. The pre-processing 11 may then also estimate the approximate location of the spinal column; this information may be useful in a polar image conversion that may be subsequently performed. Finally, extraneous content, e.g., around the borders of the image, may be removed.

Figure 2:
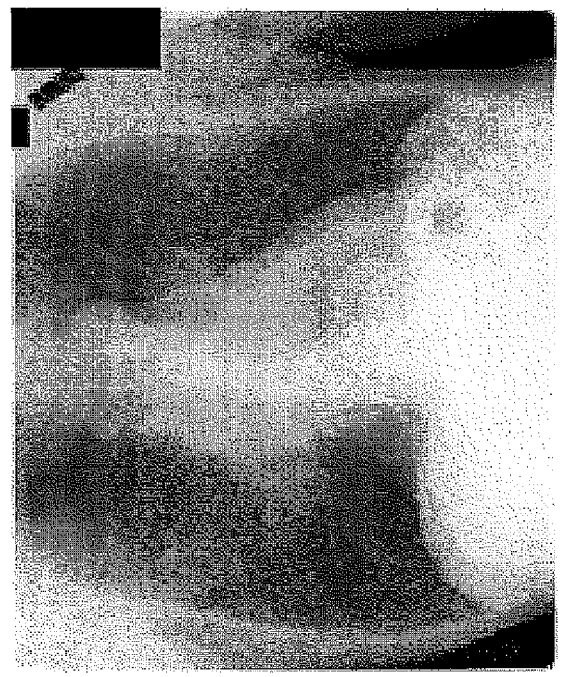
FIG. 2 shows an exemplary image that may be input to an embodiment of the invention.

In many chest radiographs, the top of the apexes of the lungs are visible. However, for example, due to patient positioning, the apexes may be outside the field-of-view of the image. The process may, therefore, classify the top of the lung image 12 as either being a lung image in which the lungs are adjacent to the top of the image (i.e., where the apexes are outside the field-of-view) or being a lung image in which the lungs are not adjacent to the top of the image (i.e., the apexes are shown within the image). FIG. 2 shows an example of an image in which the lungs are adjacent to the top of the image. In such cases, the segmentation routine may be encouraged to pass through the top row of image pixels in defining a border of the lung area of the image.

Figure 3:
FIG. 3 shows an example of shape index image that may be generated in an embodiment of the invention.

The process of classifying the lung image 12 may involve computing a shape-index image. This image may be derived based on the principle of curvatures, and methods for obtaining this image are known in the art. The shape-index image may be computed at a very coarse scale. According to one embodiment of the invention, this shape-index image may have values greater than zero where the image appears darker and values less than zero where the image appears brighter. Thus, for example, positive values may be associated with areas of air content. By reasoning about the locations of these positive values, it is possible to deduce the structure at the top of the image. FIG. 3 shows an example of such shape-index imaging applied to the image of FIG. 2.

Once the top of the image has been classified 12, the process may then proceed to segment the top of the lungs 13. According to an embodiment of the invention, a top section of the image may be transformed into the polar domain. To do this, one may first define a center coordinate location with a column value that may, for example, be equal to the spinal cord location estimate, discussed above, and with a row value that may be defined as some fraction of the number of rows of pixels in the image. The fraction may be determined, e.g., based on trial and error. Minimum and maximum radii may be defined based on some multiple (fraction) of a nominal radius value, which may, for example, be taken to be the center-row coordinate value unless a background pixel is located further away (a background pixel is defined as a pixel with a gray-scale value identically equal to zero); again the multiple of the nominal radius value may be determined by trial and error, for example.

Figure 4B:
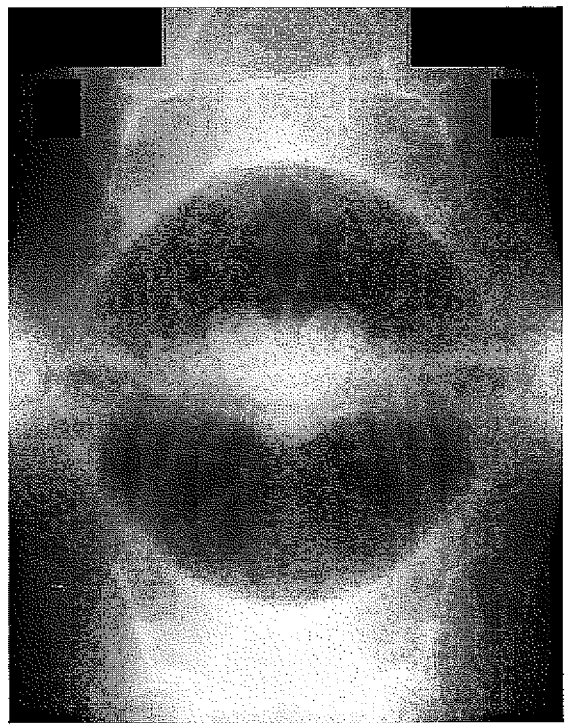
FIGS. 4A and 4B show, respectively, a gray scale image before and after a folding operation that may be incorporated into embodiments of the invention.
Figure 4A:

In order to induce a circular symmetry, an image used in computing a local cost value (to be discussed below) may be folded (mirrored) about the center coordinate location. FIGS. 4A and 4B show an example of an image prior to and after such folding, respectively. This folding may serve to include more of the lateral portions of the ribcage, which may help to constrain the overall solution. It may also result in a periodic replication in the polar domain, which may provide for an improvement in segmentation.

Figure 5B:
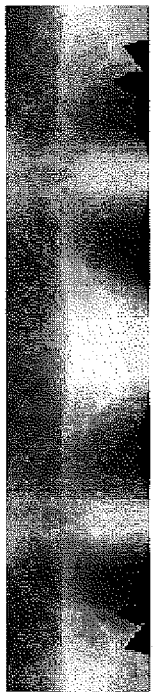
FIGS. 5A and 5B show, respectively, an example of an image before and after a polar transformation operation that may be incorporated into embodiments of the invention.
Figure 5A:

FIG. 5A shows the image of FIG. 4B, and FIG. 5B shows an image that may correspond to a polar transformation of the image of FIG. 5A, according to an embodiment of the invention. By using a polar transformation, it is noted that the ribcage, as shown in FIG. 5B, may correspond to an elongated linear structure in the polar domain.

The process may then proceed with a cost-based segmentation of the top of the lungs. In some embodiments of the invention, cost terms associated with an image may be considered in determining a local cost matrix (image). FIGS. 6A-6C show three cost term images determined, corresponding to the image of FIG. 5B. FIG. 6A shows a second derivative image, where the second derivatives, which may be computed using second derivative Gaussian kernels, may be computed along the columns of the polar image. FIG. 6B shows an image corresponding to a measure of gradient convergence, which may be computed in the rectangular domain. FIG. 6C shows a shape-index image, which may be obtained similarly to the previously discussed shape-index image. It is noted that other cost terms may be determined and used, either in addition to or instead of these.

The results of the various cost terms may then be combined to obtain a composite local cost. Such combining may comprise weighted averaging or other methods of combining. FIG. 7A shows an image for a weighted average composite cost based on the costs shown in FIGS. 6A-6C. This process may be summarized as follows.

Each pixel may be assigned a local cost, where one may, for example, use low cost values for pixels that have characteristics typical of the ribcage border. The local cost may be defined as a linear combination of individual cost images:

$$\text{local\_cost} = w_{grad}*C_{grad} + w_{shape}*C_{shape} + w_{deriv}*C_{deriv},$$

where $C_{grad}$ is the cost based on the gradient convergence, $C_{shape}$ is the cost based on the shape-index image, $C_{deriv}$ is the cost based on the second derivative image scaled. The gradient convergence image, discussed above, may be computed using a well-documented technique referred to as the COIN (Convergence Index) filter. The second derivative image, also discussed above, may be computed using a second derivative of a Gaussian kernel along the columns of the polar transformed version of the gray scale image (second derivative in the radial direction).

Each cost term may be scaled to the zero-one range so that individual cost weights, $w_{grad}$ for example, can be set in an intuitive manner. The cost weights may, for example, be set off-line to optimize the overlap between "truth segmentations" and automated segmentations.

Given the total local cost, one may then compute the cumulative cost. The cumulative cost accounts for both the local and transitional costs. The transitional cost weights the path of going from one pixel to the next. Typical transitional cost terms may include information based on gradient orientation and/or pixel distances. The total cumulative cost matrix may be defined as follows:

$$C(i,1) = \text{local\_cost}(i,1)$$

$$C(i,j+1) = \min\{C(i+s,j) + \text{local\_cost}(i,j+1) + T(n1,n2,s)\},$$

$$-k \leq s \leq k,$$

where T represents the transition cost in going from node n1 at (i+s,j) to node n2 at (i,j+1). The value "s" represents an offset between nodes when going from one column to the next. The value of this offset is not allowed to be larger than a specified value, "k". In an exemplary implementation of the invention, T was defined as follows:

$$T = w_d * \text{dist}(n1,n2),$$

where dist(n1,n2) represents the distance from n1 to n2, and $w_d$ is an associated weight (which, similarly to the other weights, may be determined on an ad hoc basis (e.g., by trial and error and/or inspection) to optimize performance.

Given the cumulative cost matrix, the ribcage border may be formed by backtracking from the point of lowest cumulative cost in the final column.

Once a composite local cost image is found, dynamic programming methods may be used to obtain an "optimal path," corresponding to the top. The dynamic programming algorithm may minimize a cumulative cost based on a combination of local costs (e.g., as in FIG. 7A) with transition costs, as discussed above (note that, in general, dynamic programming algorithms are well-known and discussed in many textbooks). FIG. 7B repeats the image shown in FIG. 7A, but with an "optimal path," which may be determined by the dynamic programming algorithm, superimposed.

It is noted that above, it was discussed that the image may be classified as either having the lungs adjacent to the top of the image or not. In the case in which the lungs are adjacent to the top of the image, as discussed above, the process may "encourage" the segmentation algorithm to pass through the top row of pixels of the image. This may be accomplished by setting the corresponding portions (top row) of the gradient convergence image and the shape index image equal to zero, which may then result in this being the minimum-cost path.

Figure 8:
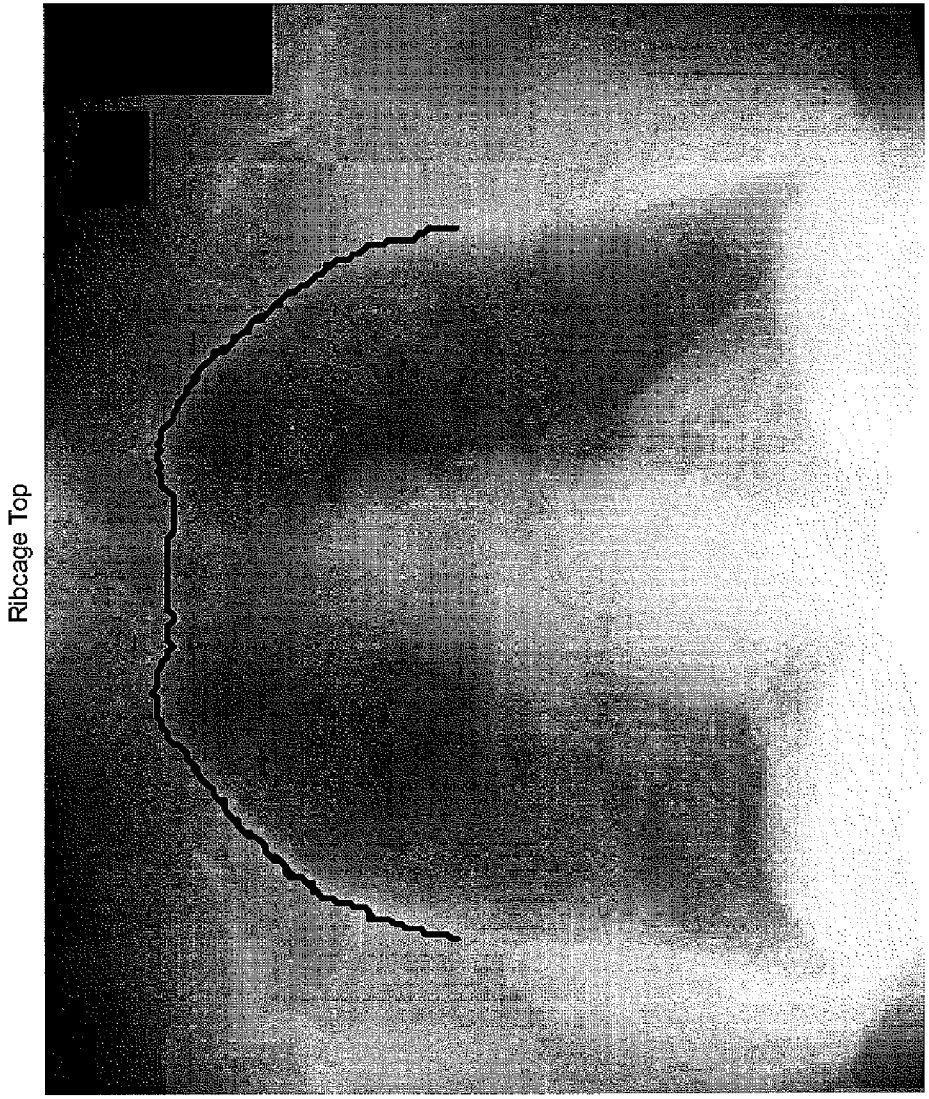
FIG. 8 shows an exemplary mask for the top of a ribcage, as may be formed according to an embodiment of the invention.

It is noted that the above computations have been done primarily in the polar domain. The path obtained in the polar domain (e.g., as shown in FIG. 7B) may be converted into the rectangular domain and formed into a binary mask of the ribcage top. An example of this is shown in FIG. 8.

Returning to FIG. 1, the process may next proceed to segment the sides of the ribcage 14. The starting locations for determining the sides may be determined based on the top mask (i.e., determination of the sides may begin at the ends of the top mask). This may serve to ensure that the lateral sections are connected to the top.

Figure 9:
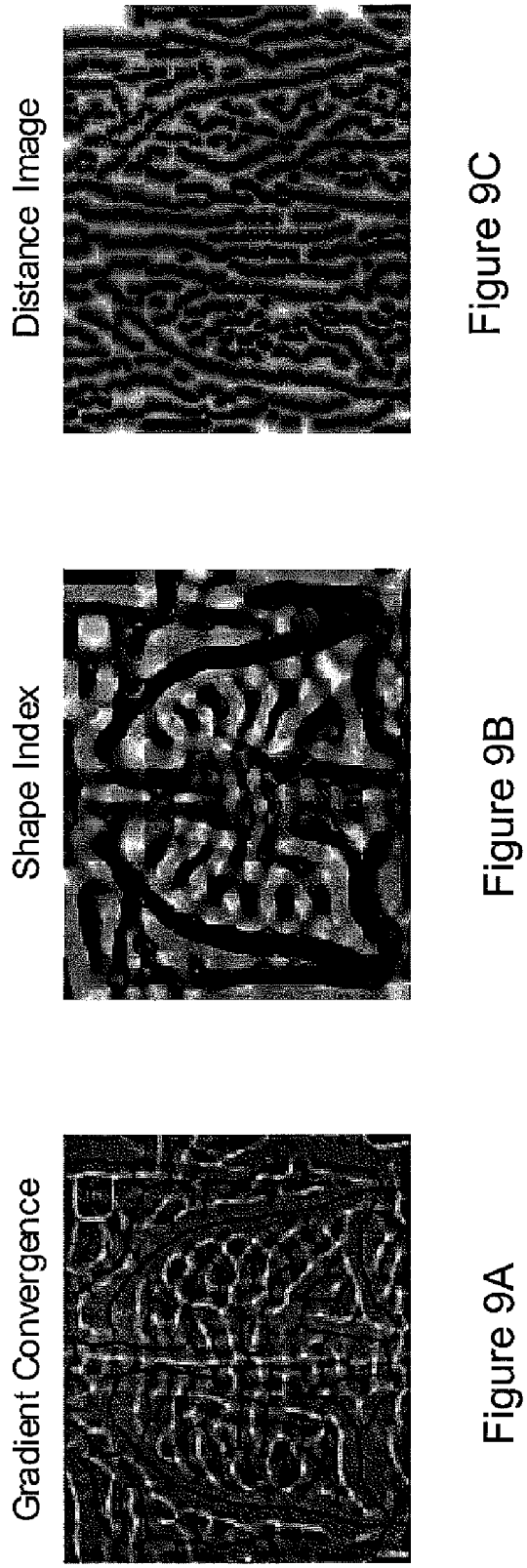
FIGS. 9A-9C show exemplary cost term images that may be obtained and used to segment the lateral portions of a ribcage, according to various embodiments of the invention.

As with the top mask, determination of the sides 14 may use dynamic programming to trace a path through a cost matrix. FIGS. 9A-9C show three exemplary cost images (matrices) that may be used for segmenting the lateral sides of the ribcage. FIG. 9A shows a gradient convergence image (see discussion above). FIG. 9B shows a shape-index image (see previous discussion). FIG. 9C shows a normalized distance image that may be determined from the minima of a second derivative image. This latter cost term, involving the normalized distance to minima in the second derivative, may be computed as follows: first, the second derivative along the rows may be computed using a second-derivative of a Gaussian kernel (in an exemplary implementation, this was done with a standard deviation size of 4.8 mm; however, the invention is not thus limited); the minima along the rows within this derivative image may then be detected, thus yielding a binary mask; and a distance transform may then be computed from the binary mask where, for example, a maximum distance can be imposed (in an exemplary implementation, 18 mm was used; however, the invention is not thus limited). The resulting distance image may then be divided by the maximum allowed distance, thus giving an image in the 0-1 range (normalized). In this fashion, the farther away a pixel is from a minimum, the greater its cost may be. It is noted that the images shown in FIGS. 9A-9C correspond to cost terms that may be associated with the image of FIG. 8. It is also noted that other cost images may be used.

Figure 10:
FIG. 10 shows an exemplary result of a segmentation of a ribcage, according to an embodiment of the invention.

As discussed previously, the cost terms may then be combined to form a local cost image; again, this may involve, for example, weighted averaging of multiple cost terms, such as those shown in FIGS. 9A-9C, but other types of combinations may be used, as well. The dynamic programming algorithm may then begin at each end of the top mask and proceed to determine "optimal" paths to define the lateral sides of the ribcage. As before, this may be done by minimizing a cumulative cost (for each side) based on the aforementioned local cost image combined with transition costs. The process may be similar to the process described above. FIG. 10 shows an image where a top mask has been combined with lateral sections that may be determined using this method.

Figure 11:
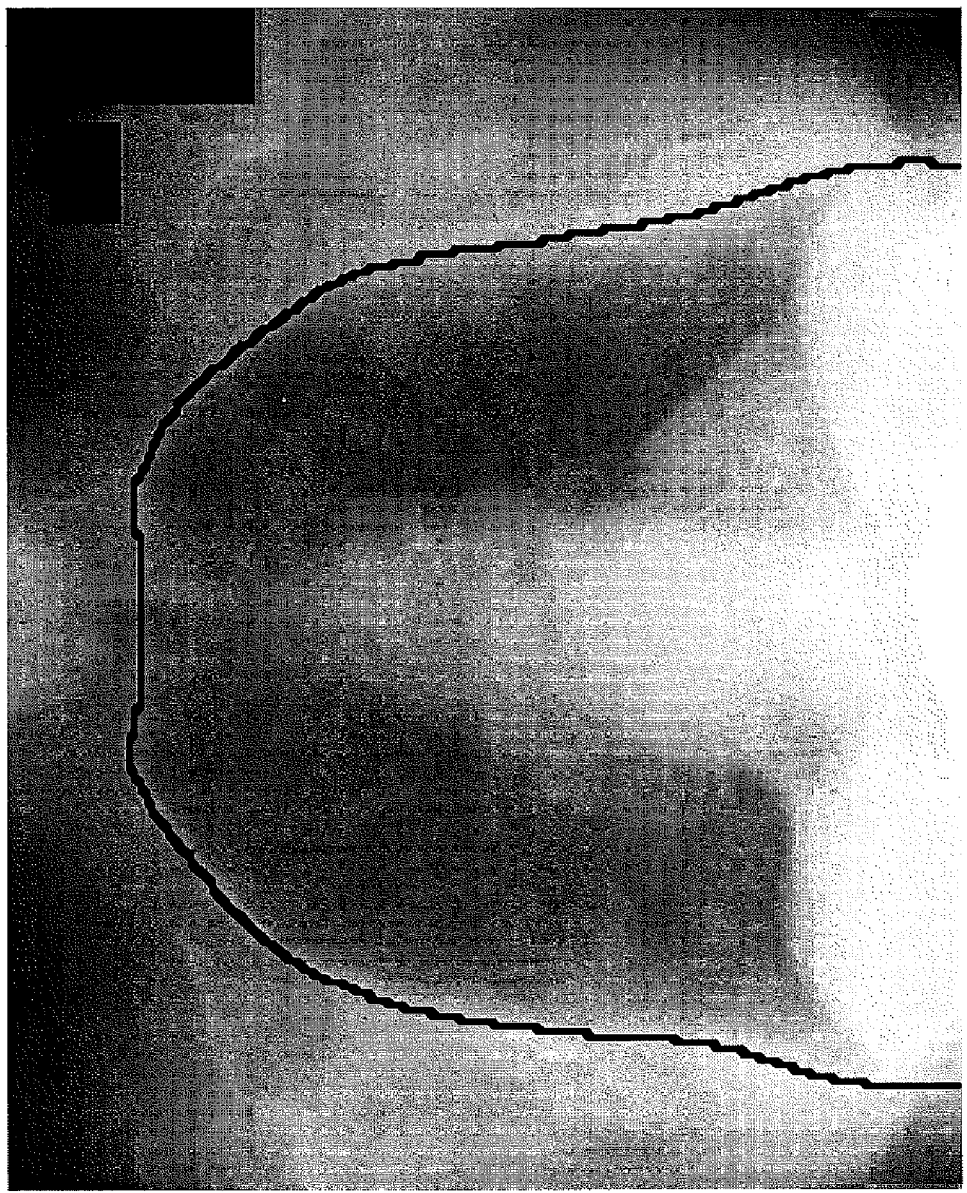
FIG. 11 shows a further exemplary result of a segmentation of a ribcage, according to an embodiment of the invention.

The mask, for example, as shown in FIG. 10, may then be subjected to post-processing 15. In post-processing, morphological and/or low-pass filtering functions may be applied to the mask, which may serve to smooth contours and/or to remove local deviations, which may, for example, be due to artifacts (e.g., tags, pacemakers, etc.). FIG. 11 shows an example of application of post-processing to the mask as shown in FIG. 10.

Figure 12:
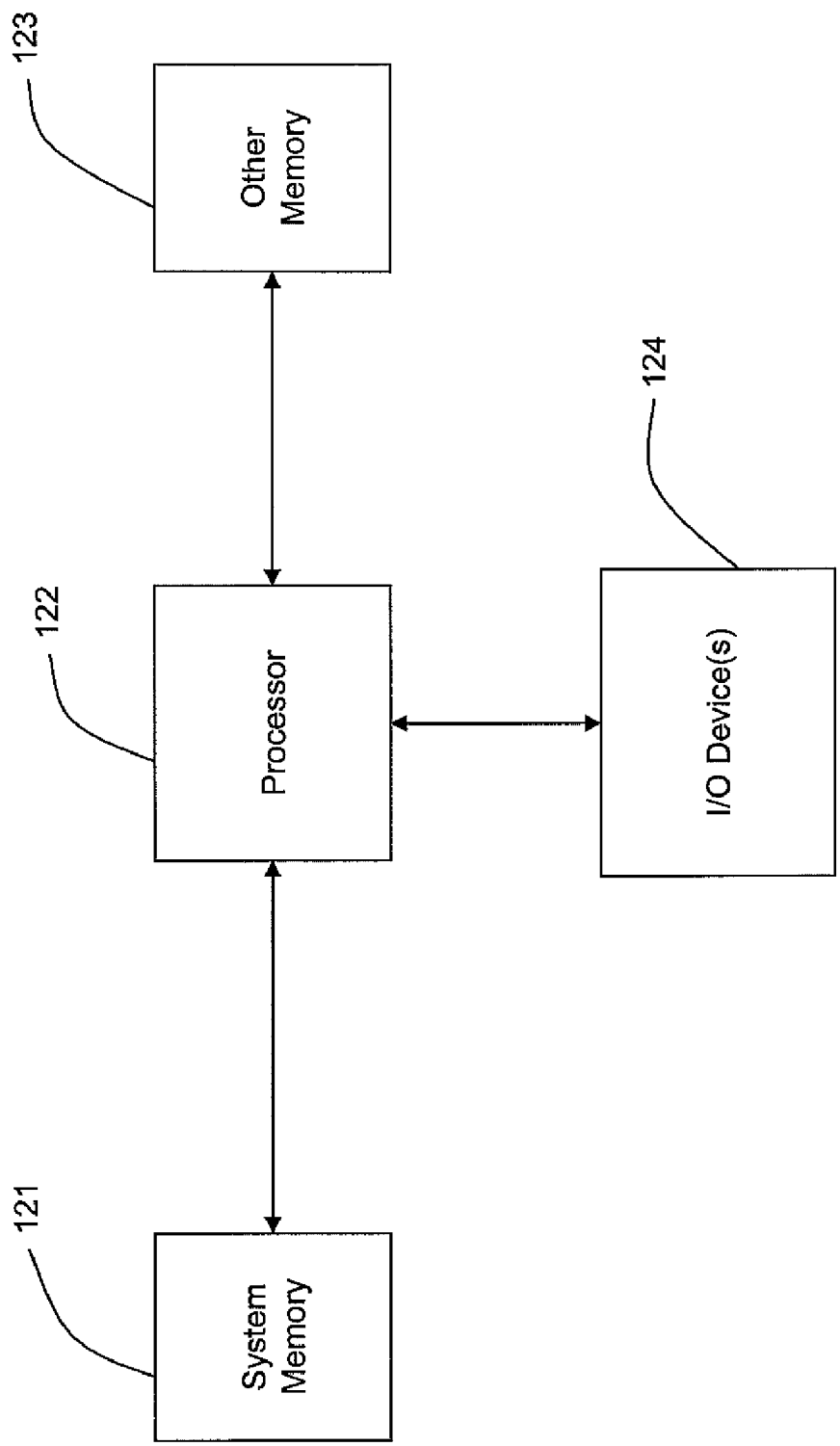
FIG. 12 shows a block diagram of a system that may be used in the implementation of some embodiments of the invention.

Various embodiments of the invention may comprise hardware, software, and/or firmware. FIG. 12 shows an exemplary system that may be used to implement various forms and/or portions of embodiments of the invention. Such a computing system may include one or more processors 122, which may be coupled to one or more system memories 121. Such system memory 121 may include, for example, RAM, ROM, or other such machine-readable media, and system memory 121 may be used to incorporate, for example, a basic I/O system (BIOS), operating system, instructions for execution by processor 122, etc. The system may also include further memory 123, such as additional RAM, ROM, hard disk drives, or other machine-readable storage media. Processor 122 may also be coupled to at least one input/output (I/O) interface 124. I/O interface 124 may include one or more user interfaces, as well as readers for various types of storage media and/or connections to one or more communication networks (e.g., communication interfaces and/or modems), from which, for example, software code may be obtained, e.g., by downloading such software from a computer over a communication network. Furthermore, other devices/media may also be coupled to and/or interact with the system shown in FIG. 12.

It will be appreciated by persons skilled in the art that the present invention is not limited by what has been particularly shown and described hereinabove. Rather the scope of the present invention includes both combinations and sub-combinations of various features described hereinabove as well as modifications and variations which would occur to persons skilled in the art upon reading the foregoing description and which are not in the prior art.

What is claimed is:

1. A method of performing ribcage segmentation in a chest image, the method comprising:
classifying a top of the chest image as having lungs adjacent to the top or not adjacent to the top;
segmenting the top of the ribcage, based on the result of said classifying, to obtain a top mask; and
segmenting at least one outer side of the ribcage, after the top of the ribcage is segmented, by using an endpoint of the top mask as a starting point,
wherein at least one of said segmenting the top of the ribcage or said segmenting at least one outer side of the ribcage comprises:
obtaining a local cost image based on the chest image; and
applying a dynamic programming algorithm to the local cost image.

2. The method of claim 1, wherein said classifying the top of the chest image comprises:
forming a shape-index image and using the shape-index image to classify the top of the chest image.

3. The method of claim 1, wherein said obtaining a local cost image comprises:
combining two or more cost images computed from the chest image to obtain the local cost image.

4. The method of claim 3, wherein said two or more cost images are selected from the group consisting of: a second derivative image; a gradient convergence image; and a shape-index image.

5. The method of claim 1, wherein said applying a dynamic programming algorithm to the local cost image comprises:
tracing a path based on a cumulative cost based on the local cost image and transition costs.

6. The method of claim 1, further comprising:
pre-processing the chest image prior to classifying the top of the chest image, wherein said pre-processing includes at least one pre-processing technique selected from the group consisting of: adjusting image resolution; locating an approximate location of a spinal column in the chest image; and removing extraneous border content from the chest image.

7. The method of claim 1, wherein said segmenting the top of the ribcage comprises transforming a top portion of the chest image to polar coordinates.

8. The method of claim 7, wherein said transforming includes:
folding the top portion of the chest image across a horizontal line to obtain a folded image having vertical symmetry; and
performing a polar transformation on the folded image.

9. A computer-readable non-transitory storage medium containing instructions that, when executed by a processor, cause the processor to implement a method of performing ribcage segmentation in a chest image, the method comprising:
classifying a top of the chest image as having lungs adjacent to the top or not adjacent to the top;
segmenting the top of the ribcage, based on the result of said classifying, to obtain a top mask; and
segmenting at least one outer side of the ribcage, after the top of the ribcage is segmented, by using an endpoint of the top mask as a starting point,
wherein at least one of said segmenting the top of the ribcage or said segmenting at least one outer side of the ribcage comprises:
obtaining a local cost image based on the chest image; and
applying a dynamic programming algorithm to the local cost image.

10. The computer-readable non-transitory storage medium of claim 9, wherein said classifying the top of the chest image comprises:
forming a shape-index image and using the shape-index image to classify the top of the chest image.

11. The computer-readable non-transitory storage medium of claim 9, wherein said obtaining a local cost image comprises:
   combining two or more cost images computed from the chest image to obtain the local cost image.

12. The computer-readable non-transitory storage medium of claim 11, wherein said two or more cost images are selected from the group consisting of: a second derivative image; a gradient convergence image; and a shape-index image.

13. The computer-readable non-transitory storage medium of claim 9, wherein said applying a dynamic programming algorithm to the local cost image comprises:
   tracing a path based on a cumulative cost based on the local cost image and transition costs.

14. The computer-readable non-transitory storage medium of claim 9, wherein the method further comprises:
   pre-processing the chest image prior to classifying the top of the chest image, wherein said pre-processing includes at least one pre-processing technique selected from the group consisting of: adjusting image resolution; locating an approximate location of a spinal column in the chest image; and removing extraneous border content from the chest image.

15. The computer-readable non-transitory storage medium of claim 9, wherein said segmenting the top of the ribcage comprises transforming a top portion of the chest image to polar coordinates.

16. The computer-readable non-transitory storage medium of claim 15, wherein said transforming includes:
   folding the top portion of the chest image across a horizontal line to obtain a folded image having vertical symmetry; and
   performing a polar transformation on the folded image.

17. An apparatus for performing ribcage segmentation in a chest image, comprising:
   means for classifying a top of the chest image as having lungs adjacent to the top or not adjacent to the top;
   means for segmenting the top of the ribcage, based on the result of said classifying, to obtain a top mask; and
   means for segmenting at least one outer side of the ribcage, after the top of the ribcage is segmented, by using an endpoint of the top mask as a starting point,
   wherein at least one of said means for segmenting the top of the ribcage or said means for segmenting at least one outer side of the ribcage comprises:
   means for obtaining a local cost image based on the chest image; and
   means for applying a dynamic programming algorithm to the local cost image.

18. The apparatus of claim 17, wherein said means for classifying the top of the chest image comprises:
   means for forming a shape-index image and using the shape-index image to classify the top of the chest image.

19. The apparatus of claim 17, wherein said means for applying a dynamic programming algorithm to the local cost image comprises:
   means for tracing a path based on a cumulative cost based on the local cost image and transition costs.

20. The apparatus of claim 17, further comprising:
   means for pre-processing the chest image prior to classifying the top of the chest image, wherein said pre-processing includes at least one pre-processing technique selected from the group consisting of: adjusting image resolution; locating an approximate location of a spinal column in the chest image; and removing extraneous border content from the chest image.

21. The apparatus of claim 17, wherein said means for segmenting the top of the ribcage is configured to transform a top portion of the chest image to polar coordinates.

22. The apparatus of claim 21 wherein said means for segmenting the top of the ribcage is configured to transform a top portion of the chest image to polar coordinates by:
   folding the top portion of the chest image across a horizontal line obtain a folded image having vertical symmetry; and
   performing a polar transformation on the folded image.

* * * * *